United States Patent
Eguro

(10) Patent No.: US 6,767,145 B2
(45) Date of Patent: Jul. 27, 2004

(54) LENS SHUTTER FOR CAMERAS

(75) Inventor: Tohru Eguro, Itabashi-ku (JP)

(73) Assignee: Nidec Copal Corporation, Tokyo (JP)

( * ) Notice: Subject to any disclaimer, the term of this patent is extended or adjusted under 35 U.S.C. 154(b) by 24 days.

(21) Appl. No.: 10/173,823

(22) Filed: Jun. 19, 2002

(65) Prior Publication Data

US 2002/0197077 A1 Dec. 26, 2002

(30) Foreign Application Priority Data

Jun. 21, 2001 (JP) .......................... 2001-188381

(51) Int. Cl.[7] ............................ G03B 9/00; G03B 9/20; G03B 9/26
(52) U.S. Cl. ...................... 396/458; 396/494; 396/497
(58) Field of Search .............................. 396/458, 459, 396/462, 494, 497

(56) References Cited

U.S. PATENT DOCUMENTS

| | | | |
|---|---|---|---|
| 5,394,212 A | * | 2/1995 | Morizumi ................... 396/505 |
| 6,099,171 A | * | 8/2000 | Takahashi ................... 396/462 |
| 6,467,975 B1 | * | 10/2002 | Tsuzuki et al. ............ 396/459 |
| 6,585,429 B2 | * | 7/2003 | Yaginuma et al. .......... 396/458 |

FOREIGN PATENT DOCUMENTS

| | | |
|---|---|---|
| JP | 2000-060088 | 2/2000 |
| JP | 2000-089295 | 3/2000 |
| JP | 2001-117135 | 4/2001 |

* cited by examiner

Primary Examiner—Christopher E Mahoney
(74) Attorney, Agent, or Firm—Pillsbury Winthrop LLP

(57) ABSTRACT

A lens shutter for cameras includes two base plates in which a blade chamber is provided between them and their apertures are superposed to provide a circular exposure aperture, at least one shutter blade located in the blade chamber to perform the opening and closing operation of the exposure aperture, a first motor mounted to one of the base plates outside the blade chamber so that an output port extends to the blade chamber to cause the shutter blade to perform the opening and closing operation, a light-amount control device located in the blade chamber to perform the introducing and removing operations with respect to the exposure aperture, and a second motor mounted to one of the base plates outside the blade chamber so that an output port extends to the blade chamber to cause the light-amount control means to perform the introducing and removing operations. In this case, the light-mount control device is located so that a part thereof always overlaps the shutter blade adjacent thereto in any operating condition.

6 Claims, 8 Drawing Sheets

LENS SHUTTER FOR CAMERAS

BACKGROUND OF THE INVENTION

1. Field of the Invention

This invention relates to a lens shutter for cameras provided with a light-amount control means which is capable of limiting the amount of light from an object, reaching a film or a CCD, for example, by restricting the diameter of an exposure aperture.

2. Description of Related Art

As is well known, shutters for cameras are divided into two types: a lens shutter located close to a photographic lens and a focal-plane shutter located immediately before a film or a CCD. The lens shutter is such that a circular exposure aperture is opened and closed, and in general, the exposure aperture is opened from the center thereof and closed toward the center by a plurality of shutter blades. However, a lens shutter having a single shutter blade is also available in which the exposure aperture is opened from a predetermined periphery thereof and closed toward the periphery after fully opened.

On the other hand, a camera generally has a light-amount control mechanism placed close to a photographic lens. Such light-amount control mechanisms commonly used are called diaphragm mechanisms, which are of two main types. One is constructed so that a plurality of stop blades are rotated simultaneously in the same direction or operated (including rotation) simultaneously in an opposite direction, and the diameter of the aperture can be continuously changed, with the optical axis as a center, by the cooperation of these blades. The other is such that, by providing a stop member with at least one circular aperture which is smaller in diameter than the exposure aperture or a plurality of stop members with a single aperture, the aperture can be selectively introduced into a photographing optical path.

In addition to the diaphragm mechanisms, mechanisms using ND filters are available for the light-amount control mechanisms. In this case, there are those in which one ND filter having a predetermined density is introduced into the exposure aperture and those in which a plurality of ND filters different in density are provided and selectively introduced into the exposure aperture. In the mechanisms using the ND filters, there are those combined with the diaphragm mechanisms of the latter type, of the diaphragm mechanisms of the above two types. As an example, a circular aperture smaller in diameter than the exposure aperture is covered with the ND filter, and this covered aperture is introduced into the exposure aperture. Such a light-amount control mechanism is suitable for the case where it is desirable that the influence of diffraction is excluded because the amount of light from the object can be materially reduced without extremely diminishing the aperture.

As will be seen from the above description, the lens shutter mechanism and the light-amount control mechanism are not located immediately before the film or the CCD, but close to the photographic lens. Thus, in a camera provided with these two mechanisms, it has been common practice to manufacture the two mechanisms as one unit. An example of this case is set forth in Japanese Patent Kokai No. 2001-117135.

As is well known, in the case where only the lens shutter mechanism is unified, the mechanism has been constructed so that shutter blades are operated in a blade chamber provided between two plate members. Even where only the light-amount control mechanism is unified, stop blades are operated in the blade chamber provided between the two plate members. In the case where the two mechanisms are simply unified, therefore, two chambers must be provided by four plate members. However, this structure is unfavorable for a low cost and a reduction in thickness (a diminution in dimension in a direction along the optical axis) of the unit. Consequently, as set forth in the above publication, it has been common practice to provide two chambers by three plate members.

Units of this type have been used in compact cameras, and most of them have been motorized. With a rapid development in digital cameras, demands for cost reduction and compactness of such a unit have recently been further increased. In particular, the unit of this type is placed in the proximity of the photographic lens, and thus a reduction in thickness of a circular region, with the optical axis adjacent to the photographic lens as a center, is greatly required.

SUMMARY OF THE INVENTION

It is, therefore, an object of the present invention to provide a lens shutter for cameras which is suitable for compactness, designed so that, at least, the thickness of an area immediately the photographic lens is reduced, irrespective of the integration of the shutter mechanism and the light-amount control mechanism which are operated by individual motors.

In order to achieve the above object, the lens shutter for cameras of the present invention includes two base plates in which a blade chamber is provided between them and their apertures are superposed to provide a circular exposure aperture, at least one shutter blade located in the blade chamber to perform the opening and closing operation of the exposure aperture, a first motor mounted to one of the base plates outside the blade chamber so that an output port extends to the blade chamber to cause the shutter blade to perform the opening and closing operation, a light-amount control means located in the blade chamber to perform the introducing and removing operations with respect to the exposure aperture, and a second motor mounted to one of the base plates outside the blade chamber so that an output port extends to the blade chamber to cause the light-amount control means to perform the introducing and removing operations. In this case, the light-mount control means is located so that a part thereof always overlaps the shutter blade adjacent thereto in any operating condition.

In the lens shutter for cameras of the present invention, the light-amount control means may have an aperture smaller in diameter than the exposure aperture so that the aperture is introduced into, and removed from, the exposure aperture. In this case, when the aperture of the light-amount control means is covered with the sheet of the ND filter, light from the object can be further attenuated.

In the lens shutter for cameras of the present invention, the light-amount control means is constructed with a first member having an aperture smaller in diameter than the exposure aperture and a second member having only the function of blocking light. Where the aperture of the first member is introduced into the exposure aperture, a gap is provided between the first member and the edge of the exposure aperture. When the gap is covered with the second member, the contour of each of the base plates can be diminished. In this case also, when the aperture of the first member is covered with the sheet of the ND filter, the light from the object can be further attenuated.

In the lens shutter for cameras of the present invention, the light-amount control means may be constructed with two stop blades which are relatively rotated so that the area of the exposure aperture can be limited by these two stop blades.

In the lens shutter for cameras of the present invention, the light-amount control means may be constructed with a sheet material of the ND filter.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
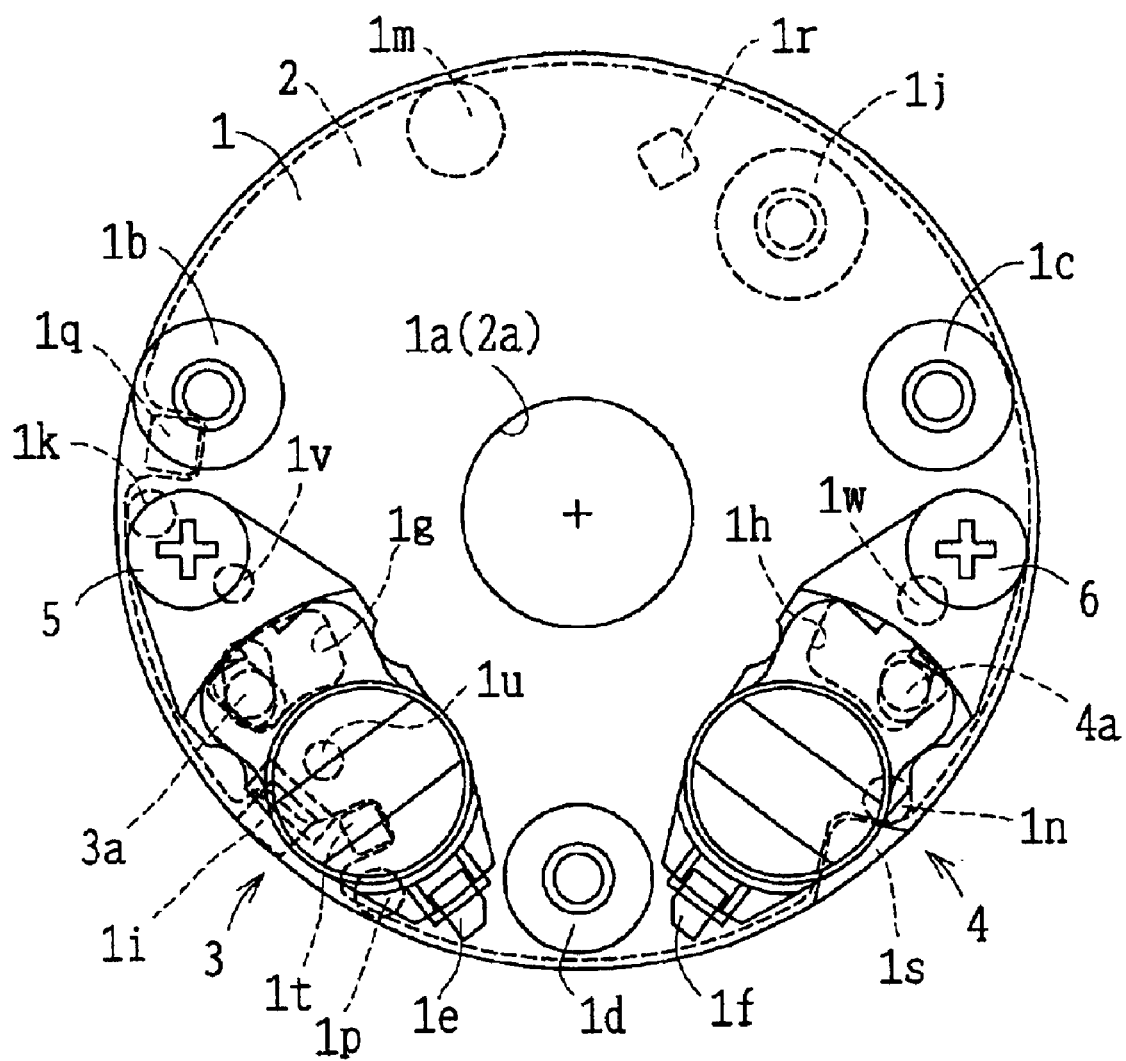
FIG. 1 is a plan view showing the initial state of a first embodiment, viewed from the object side.

The present invention will be explained in accordance with two embodiments shown in the drawings. Each of these embodiments has the structure which can be used in either a film camera or a digital camera, but is conveniently described here with respect to the case where it is applied to the digital camera. In the description of the structure, it is assumed that the object side is referred to as a surface side and the image sensor side as a back side.

First Embodiment

The first embodiment of the present invention will be described with reference to FIGS. 1–5. In accordance with FIGS. 1 and 2, the structure of the first embodiment is first explained. In the first embodiment, a main base plate 1 placed on the surface side and an auxiliary base plate 2 placed on the back side are provided with a blade chamber interposed between them. The two base plates 1 and 2 are both made of synthetic resin and have almost the same contour so that an exposure aperture (a maximum diameter) is restricted by circular apertures 1a and 2a provided at about the middle of the base plates. Also, in FIG. 2, the contour of the main base plate 1 is indicated by a two-dot chain line, and the same holds for the cases of the FIGS. 3–5.

Subsequently, a description is given of the structure of the main base plate 1 on the surface side thereof, chiefly using FIG. 1. Three mounting portions 1b, 1c, and 1d used to mount the shutter to a camera are provided in such a manner as to surround the aperture 1a. Two motors 3 and 4 are mounted by hooks 1e and 1f constructed integrally with the main base plate 1 and screws 5 and 6, respectively. Each of these motors 3 and 4 is referred to as a moving-magnet motor which is set forth, for example, in Japanese Patent Kokai No. 2000-60088, and a specific explanation of its structure is omitted because of a well-known structure. A rotor of a permanent magnet is rotated only in a preset angle range, and a driving pin 3a or 4a provided to a part projecting radially therefrom is inserted into the blade chamber through a slot 1g or 1h configured in the main base plate 1.

Next, the structure of the main base plate 1 on the back side thereof is described. Reference is first made to parts shown in FIG. 1, but not in FIG. 2. The main base plate 1 and the auxiliary base plate 2 are mutually mounted in such a manner that the edge of the auxiliary base plate 2 is put on a hook 1i provided on the main base plate 1, and a screw, not shown, is inserted from the back side of the auxiliary base plate 2 into a hole 2b (see FIG. 2) of the auxiliary base plate 2 and is tightened into a mounting portion 1j of the main base plate 1. This mounting portion 1j also serves as a spacer between the main base plate 1 and the auxiliary base plate 2, but in addition to this, special spacers 1k, 1m, and 1n are provided on the main base plate 1.

Figure 2:
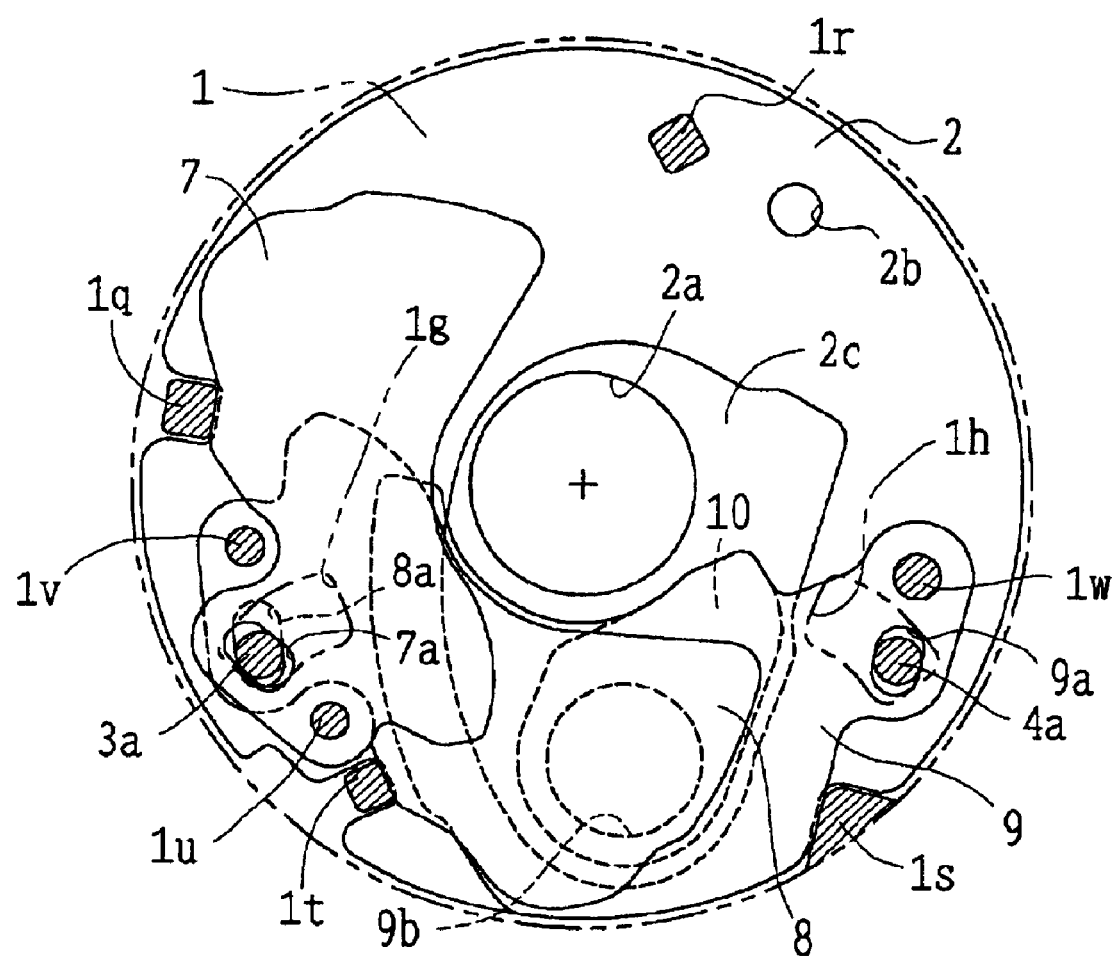
FIG. 2 is a plan view showing the initial state inside the blade chamber of the first embodiment, viewed form the object side.

In FIG. 2, parts provided on the back side of the main base plate 1 are shown in cross sections together with the driving pins 3a and 4a. Stoppers 1q, 1r, 1s, and 1t for operating members to be described later are provided on the main base plate 1. On the back side of the main base plate 1, shanks 1u, 1v, and 1w are provided. A shutter blade 7 is rotatably mounted to the shank 1u, while a shutter blade 8 is rotatably mounted to the shank 1v. These shutter blades 7 and 8 are arranged so that the shutter blade 7 is situated on the surface side, and as is well known, the driving pin 3a is fitted into slots 7a and 8a provided in the blades.

To the shank 1w, a stop member 9 located on the side of the auxiliary base plate 2 of the shutter blade 8 is rotatably mounted. The stop member 9 has a slot 9a and a circular aperture 9b smaller in diameter than the exposure aperture (consisting of the apertures 1a and 2a), and the driving pin 4a is fitted into the slot 9a. On the back side of the stop member 9, a sheet-like ND filter 10 is mounted to cover the aperture 9b. The ND filter 10 is operated in a concavity 2c configured in the auxiliary base plate 2 so that it does not come in contact with the auxiliary base plate 2 during the operation of the stop member 9.

Subsequently, the operation of the first embodiment is described with reference to FIGS. 2–5 in the case where it is applied to the digital camera as already explained. The digital camera is of a normal open type, and when a power source is turned on, the stop member 9 is removed from the exposure aperture, which is fully opened by the shutter blades 7 and 8. An image sensor is thus exposed to light from the object, and an image of the object can be observed through a monitor. Although in this case the motors 3 and 4 are not energized, well-known motor characteristics impart a counterclockwise rotating force to the rotator of the motor 3 and a clockwise rotating force to the rotor of the motor 4. Hence, the shutter blades 7 and 8 are brought into contact with the stopper 1q and 1t, respectively, and the stop member 9 is also brought into contact with the stopper 1s.

Figure 3:
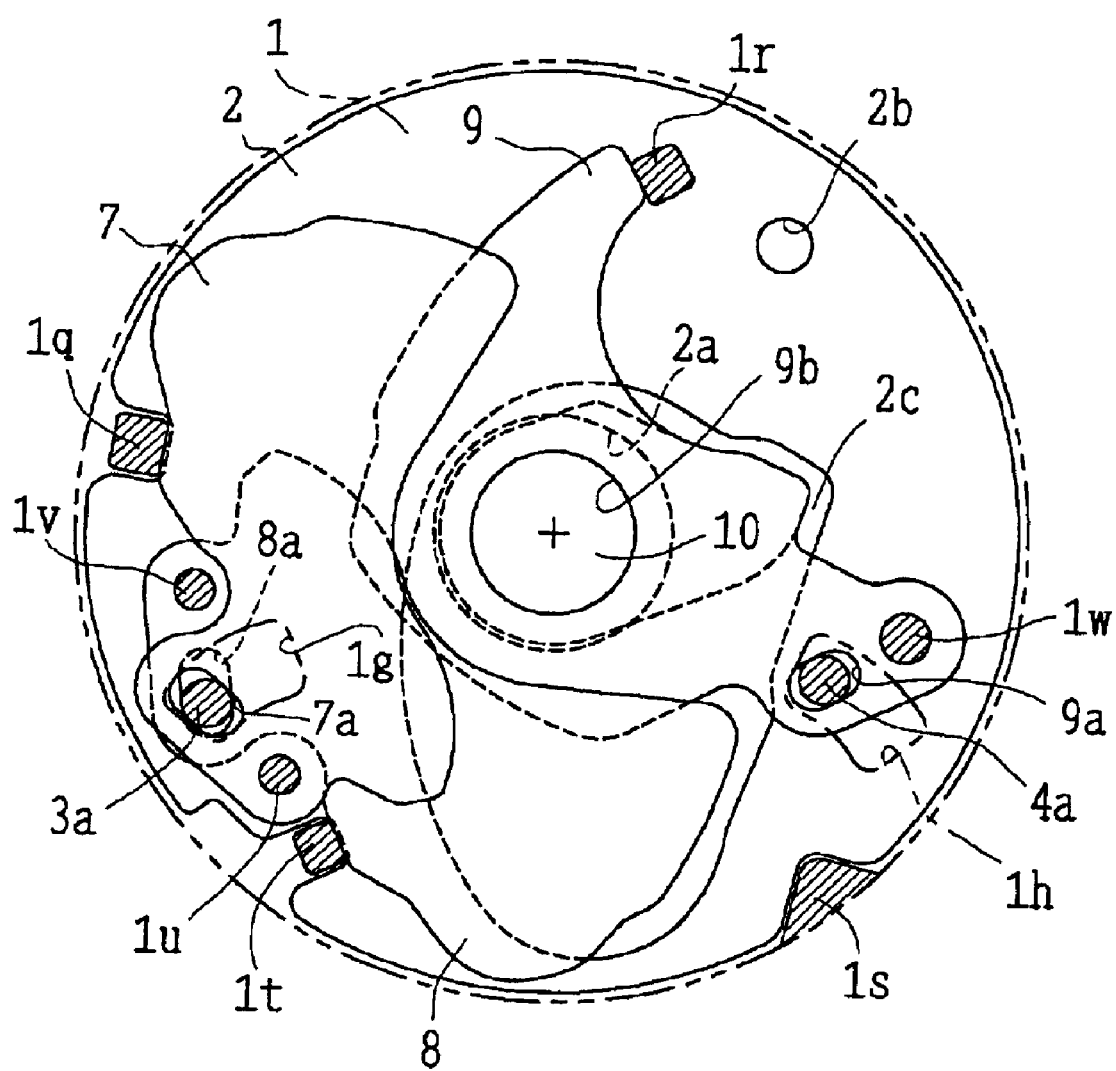
FIG. 3 is a plan view showing a state where the aperture of a stop member is introduced into the exposure aperture from a state of FIG. 2 in the first embodiment, viewed in the same manner as in FIG. 2.

In this state, when a shutter button is pushed, whether photographing is performed by or without reducing the amount of light from the object is determined in accordance with the measuring result of light from the object. Where it is determined that photographing is performed by reducing the amount of light from the object, the rotor of the motor 4 is rotated counterclockwise and the stop member 9 is rotated clockwise. The stop member 9 slides along the shutter blade 8 and stops when its top abuts on the stopper 1r. That is, the stop member 9 always maintains a sliding relation with the shutter blade 8 from the start of the operation of the stop member 9 to the stop thereof. Such a stopped state is illustrated in FIG. 3. In this case, power to the motor 4 need not necessarily be disconnected, but even though it is disconnected, this state is maintained due to the well-known motor characteristics. Also, depending on the specification of a camera, the shutter may be set so that the above state is not brought about by the release of the camera, but automatically in accordance with light from the object.

Figure 4:
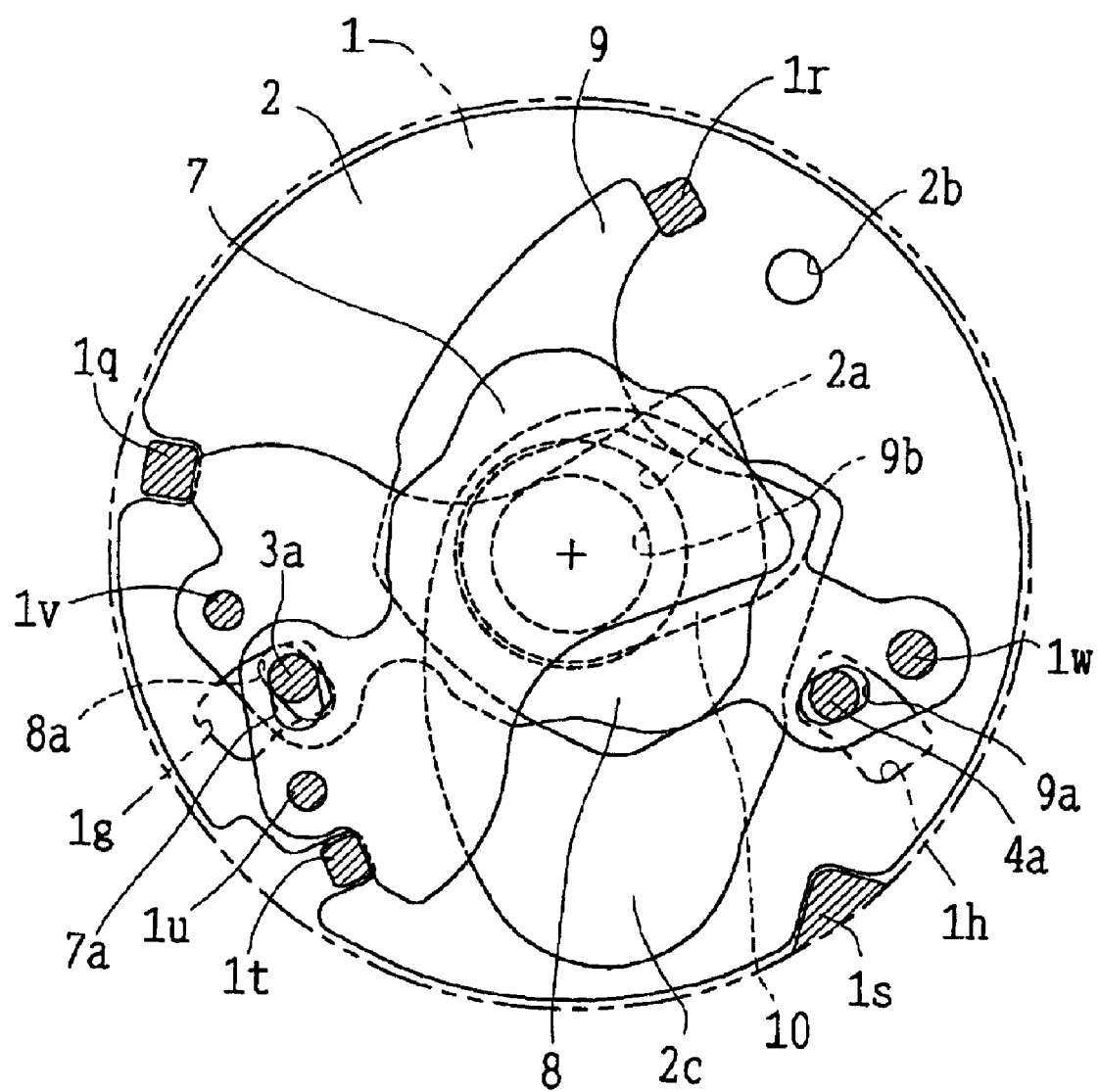
FIG. 4 is a plan view showing a state where shutter blades are closed from a state of FIG. 3 in the first embodiment, viewed in the same manner as in FIGS. 2 and 3.
Figure 5:
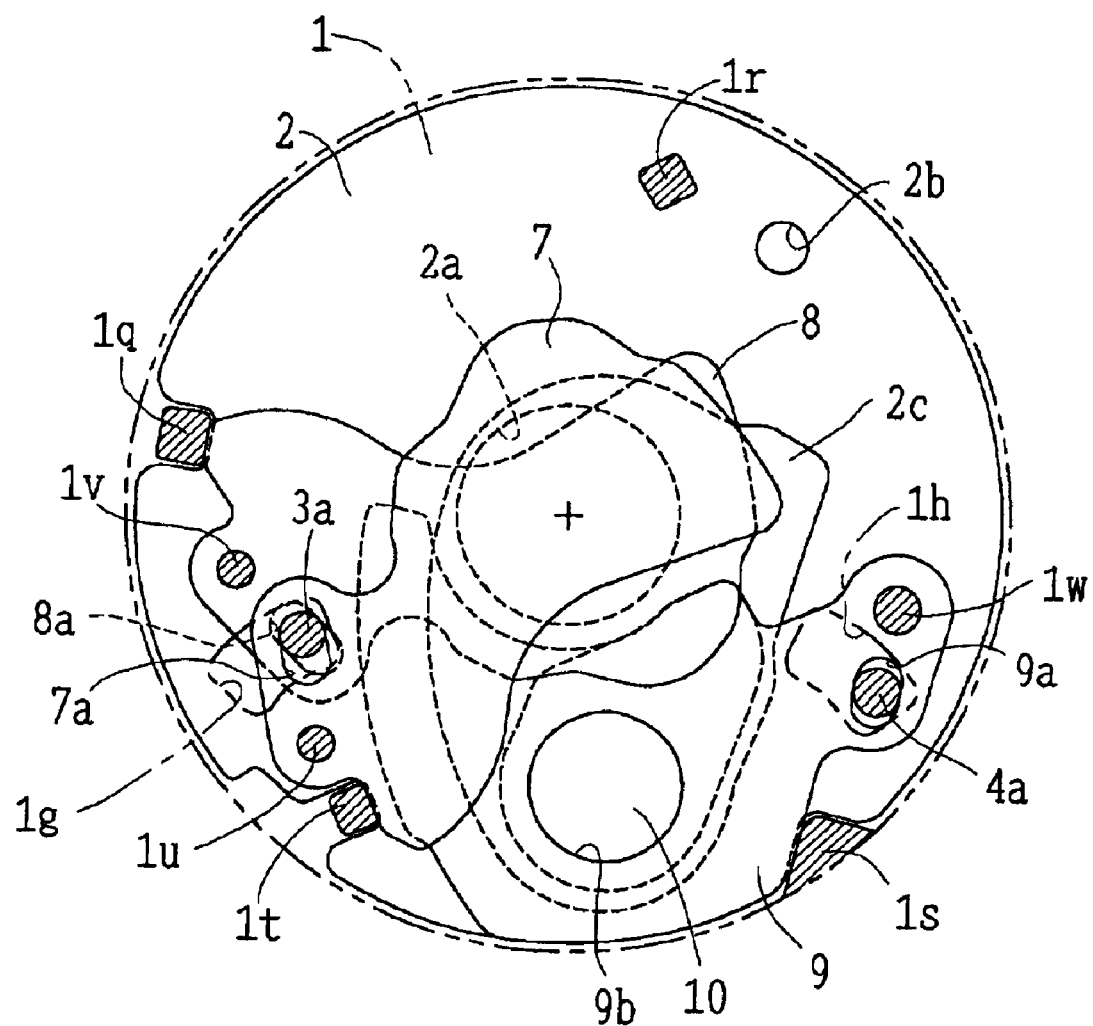
FIG. 5 is a plan view showing a state where the shutter blades are closed from a state of FIG. 2 in the first embodiment, viewed in the same manner as in FIGS. 2–4.

When a state of FIG. 3 is obtained in this way, a signal for starting photography is then transmitted to an imaging device. After a preset photographing time passes, the motor 3 is energized by a control circuit and the rotor is rotated clockwise. Consequently, the shutter blades 7 and 8 are rotated in directions opposite to each other, and in this case, the shutter blade 8 slides along the stop member 9. After closing the aperture 9b, the shutter blades 7 and 8 abut on the stoppers 1t and 1q, respectively, and stop. That is, the shutter blade 8 consistently maintains a sliding relation with the stop member 9 from the start of the operation of the shutter blade 8 to the stop thereof. This stopped state is illustrated in FIG. 4.

After that, upon transmission of imaging information to a memory device in this closed state, the motors 3 and 4 are energized at almost the same time. In this case, however, unlike the above case, an electric current is supplied in a reverse direction, and thus any of the shutter blades 7 and 8 and the stop member 9 is rotated in a direction opposite to the direction described above. In this case also, the sliding relation between the shutter blade 8 and the stop member 9 is consistently maintained. The shutter blades 7 and 8 abut on the stoppers 1q and 1t, respectively, and the stop member 9 abuts on the stopper is to stop. Immediately after this, power to the motors 3 and 4 is disconnected, and the shutter is restored to an initial state of FIG. 2.

Where light from the object is not relatively bright and photographing is performed without using the aperture 9b as mentioned above, photographing is started without energizing the motor 4 in a state of FIG. 2. After a preset photographing time passes, the motor 3 is energized by the control circuit and the rotor is rotated clockwise. Consequently, the shutter blades 7 and 8 are rotated in directions opposite to each other, and in this case, the shutter blade 8 slides along the stop member 9. Finally, the shutter blades 7 and 8 are stopped in a state of FIG. 5 in such a manner as already described, and during this period, the sliding relation between the shutter blade 8 and the stop member 9 is consistently maintained. Thus, it is needless to say that, after that, the shutter blades 7 and 8 are restored to a state of FIG. 2, but in this case also, the sliding relation between the shutter blade 8 and the stop member 9 is maintained.

According to the first embodiment, as mentioned above, the shutter is constructed so that partial contact between the shutter blade 8 and the stop member 9 is consistently maintained and the area of this contact is continuously changed in any operating condition. As such, the shutter blade 8 will not engage the stop member 9, and as a matter of course, the shutter blade 7 located on the surface side of the shutter blade 8 and always coming in partial contact with the shutter blade 8 will not engage the stop member 9. Consequently, it is not necessary that the blade chamber, as described in the above publication, is partitioned into two parts by a plate member (an intermediate plate), and therefore the thickness of an area in the proximity of the exposure aperture can be reduced, at least, by a thickness corresponding to the plate member. In addition, cost can be reduced because the plate member is dispensed with.

The first embodiment is constructed so that the aperture 9b smaller in diameter than the exposure aperture is provided to the stop member 9 and is covered with the ND filter 10. However, the aperture 9b may be merely provided without using the ND filter 10, depending on the specification of the camera in this case, the stop member 9 may be provided with a plurality of apertures which have diameters smaller than the exposure aperture and different from one another so that these aperture are turned by a stepping motor and a desired diameter can be chosen. Moreover, a part of the apertures may be covered with the ND filter. In this case, when there are a plurality of apertures to be covered with the ND filter, an aperture of identical size may be covered with an ND filter of different density.

Unlike the first embodiment, the stop member 9 may be made of only the sheet material of the ND filter without providing the stop member 9 with the aperture 9b. A member constructed in this way is a light-amount control member, but can no longer be called the stop member. Some of well-known diaphragm mechanisms are such that the diameter is controlled by a plurality of stop blades. In this case also, when the most shutter-blade-side stop blade is located so that the sliding relation with an adjacent shutter blade is always maintained in any operating condition, the object of the present invention can be accomplished. Also, although in the first embodiment the two shutter blades 7 and 8 are used, the present invention is applicable even when a single shutter blade is used.

Second Embodiment

Figure 6:
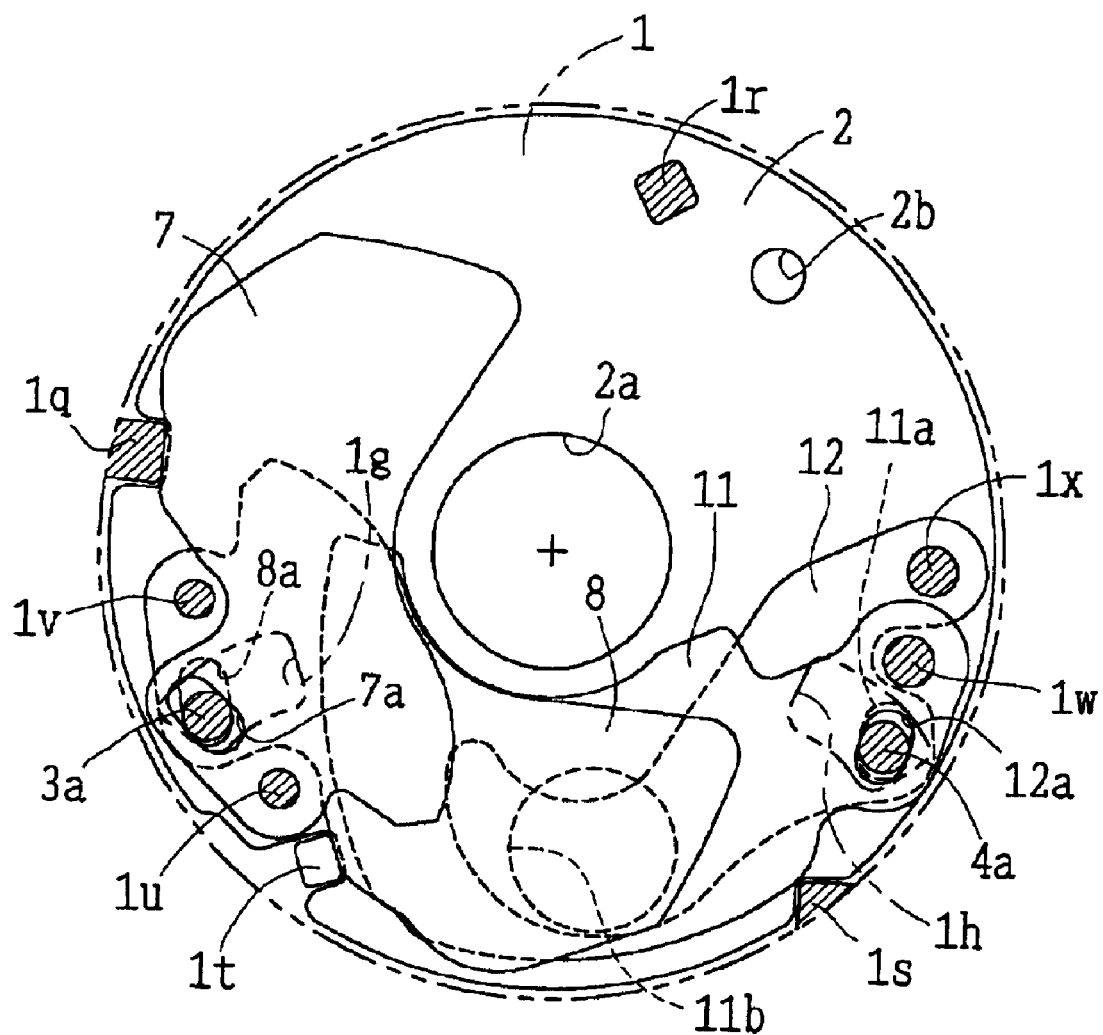
FIG. 6 is a plan view showing the initial state of a second embodiment in the same manner as in FIG. 2 of the first embodiment.

In accordance with FIGS. 6–8, the second embodiment of the present invention will be described. The second embodiment is radically different from the first embodiment in having a stop member 11 and a light-blocking member 12 instead of the stop member 9 of the first embodiment. Therefore, although other components are somewhat different in shape, like numerals are used for substantially like members and parts, and their detailed explanation is omitted. Only different points will be described below.

A structure peculiar to the second embodiment is first described with reference to FIG. 6. The stop member 11 has a slot 11a and an aperture 11b smaller in diameter than the exposure aperture and is rotatably mounted to the shank 1w. However, the aperture 11b, unlike the aperture 9b of the first embodiment, is not covered with the ND filter, and thus the auxiliary base plate 2 is not provided with the concavity 2c such as that of the first embodiment. Also, although the stop member 11 of the second embodiment is different in contour from the stop member 9 of the first embodiment, it is hard to find its difference from FIG. 6 alone and this will be clarified by the explanation of operation to be given later.

The main base plate 1 of the second embodiment is provided with a shank 1x on the blade chamber side. The light-blocking member 12 situated on the side of the auxiliary base plate 2 of the stop member 11 is rotatably mounted to the shank 1x. The driving pin 4a of the motor 4 is fitted into both the slot 11a of the stop member 11 and a slot 12a of the light-blocking member 12. Consequently, the stop member 11 and the light-blocking member 12 are rotated simultaneously by the motor 4, but have different angles of rotation because distances from the slots 11a and 12a to the shank 1w and 1x are different.

Subsequently, reference is made to the operation of the second embodiment. The second embodiment is described with respect to the case where it is used in the digital camera of a normal open type. FIG. 6 shows an initial state of the second embodiment. When the power is turned on, the stop member 11 and the light-blocking member 12 are removed from the exposure aperture, which is fully opened by the shutter blades 7 and 8. Hence, the image sensor is exposed to light from the object, and the image of the object can be observed through the monitor. In this state, when the shutter button is pushed, whether photographing is performed by or without reducing the amount of light from the object is determined in accordance with the measuring result of light from the object.

Where photographing is performed without reducing the amount of light from the object, the shutter blades 7 and 8 are merely operated, which is entirely the same as in the first embodiment. The explanation in this case is thus omitted.

Where photographing is performed by reducing the amount of light from the object, the rotor of the motor 4 is rotated counterclockwise to rotate the stop member 11 and the light-blocking member 12 clockwise at the same time. The stop member 11 slides along the shutter blade 8 and stops when its top abuts on the stopper 1r. Such a stopped state is illustrated in FIG. 7. In this case, the light-blocking member 12 is smaller in angle of operation than the stop member 11, and thus only a part thereof is introduced into the exposure aperture. As seem from this, the stop member 11 of the second embodiment is such that the aperture 11b is introduced into the exposure aperture, but unlike the stop member 9 of the first embodiment, other area of the exposure aperture is not completely covered, so that the light-blocking member 12 covers a lower-left area in FIG. 7 which is not covered.

This means that the stop member 11 of the second embodiment is smaller than the stop member 9 of the first embodiment. Whereby, it becomes possible to reduce the diameter of the main base plate 1 and achieve compactness of the entire unit. As seen from minute comparison, the shutter blades 7 and 8 vary slightly in shape, but the structure and the mounting position, with the optical axis as a center, of each of the motors 3 and 4 remains unchanged, and the relation of an arrangement with the photographic lens is such that the same condition as in the first embodiment is obtained. However, if the position of each of the motors 3 and 4 in the relation with the photographic lens, although somewhat, can be shifted, further compactness will be attained. Also, although compactness of this degree may seem insignificant, downsizing of 0.5–1 mm is intrinsically valuable in the field of units as small as 30–35 mm in actual diameter.

Figure 7:
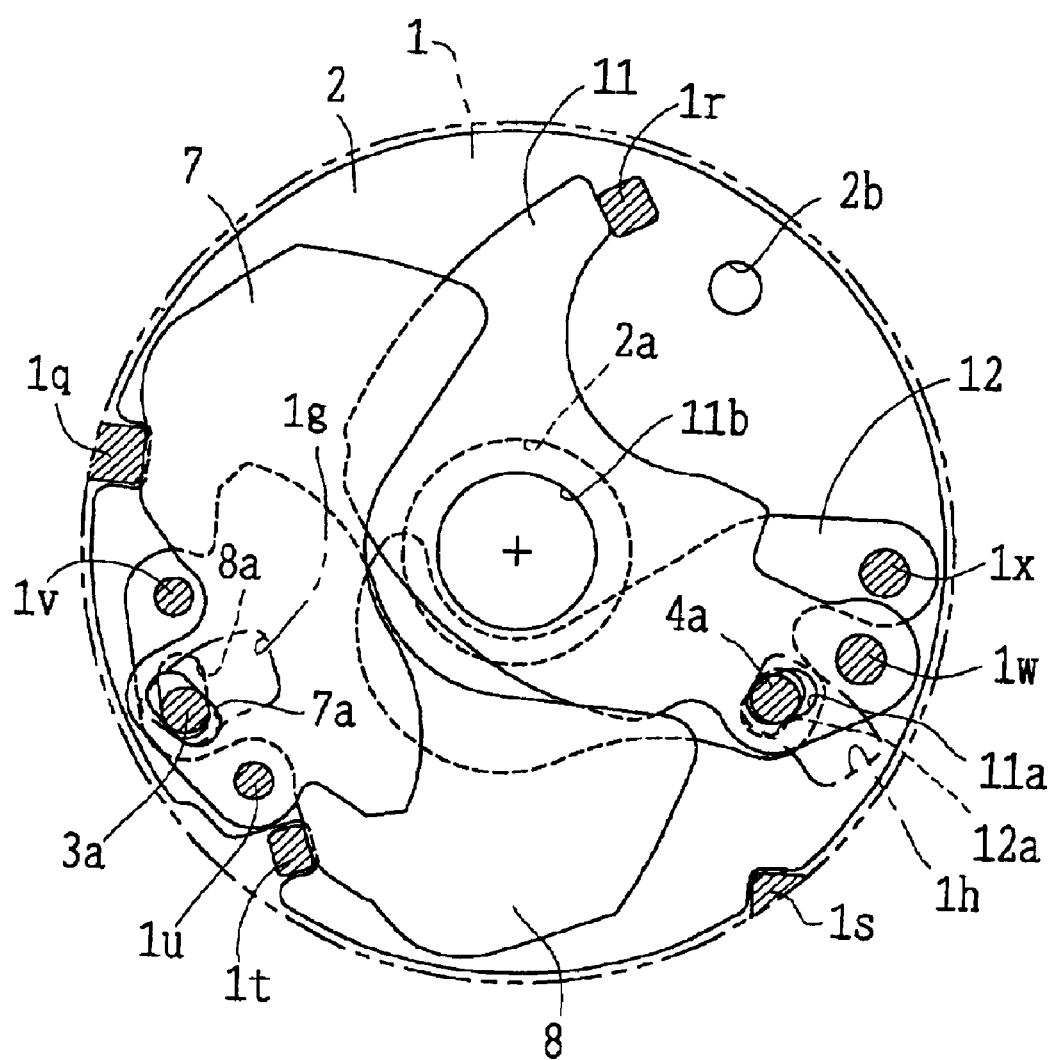
FIG. 7 is a plan view showing a state where the aperture of a stop member is introduced into the exposure aperture from a state of FIG. 6 in the second embodiment, viewed in the same manner as in FIG. 6.
Figure 8:
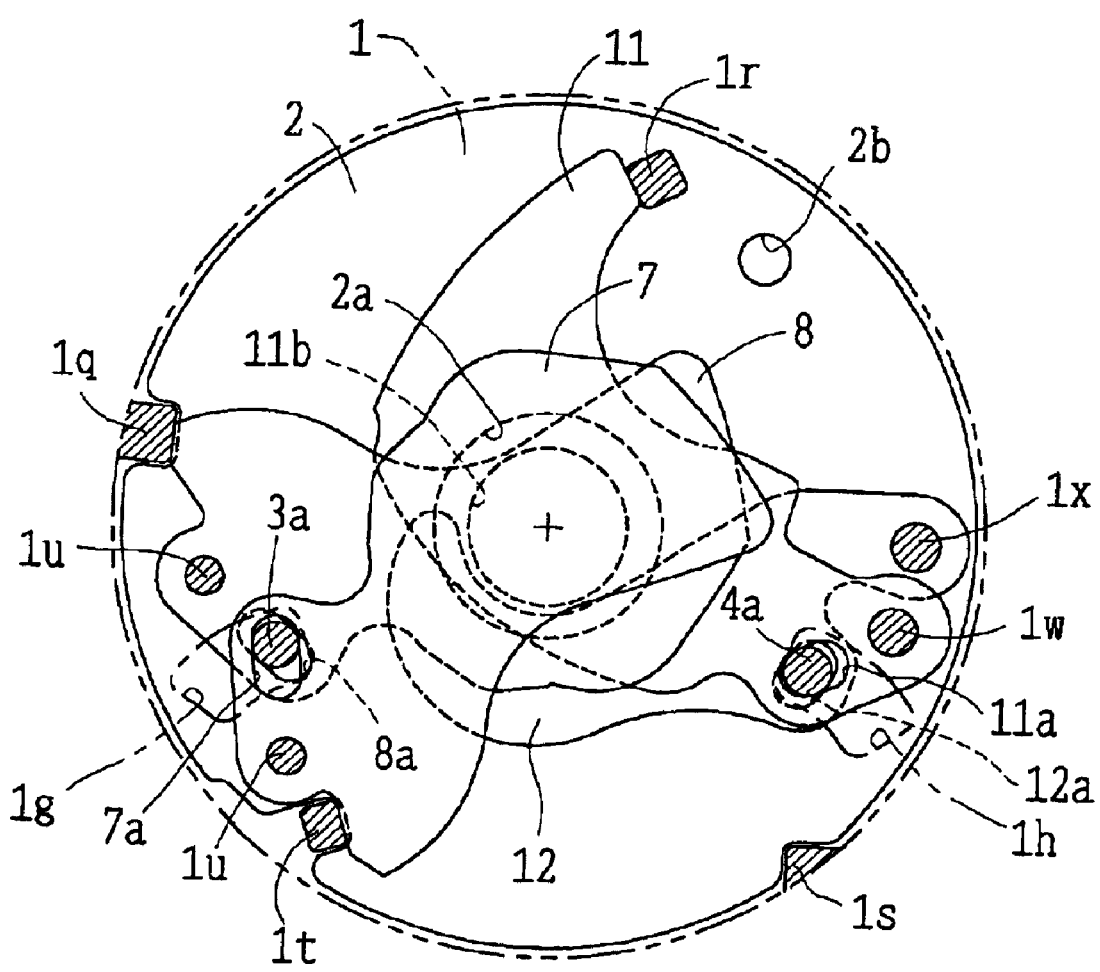
FIG. 8 is a plan view showing a state where the shutter blades are closed from a state of FIG. 7 in the second embodiment, viewed in the same manner as in FIGS. 6 and 7.

When a state of FIG. 7 is brought about in this way, the signal for starting photography is then transmitted to the imaging device. After a preset photographing time passes, the motor 3 is energized and the rotor is rotated clockwise. Consequently, the shutter blades 7 and 8 are rotated in directions opposite to each other, and after the aperture 11b is closed, the shutter blades 7 and 8 stop when abutting on the stoppers 1t and 1q, respectively. This stopped state is illustrated in FIG. 8. After that, upon transmission of imaging information to the memory device in this closed state, electric currents are supplied in reverse directions to the motors 3 and 4, and any of the shutter blade 7, the shutter blade 8, the stop member 11, and the light-blocking member 12 is rotated in a direction opposite to the direction stated above. The shutter blades 7 and 8 stop when abutting on the stoppers 1q and 1t, respectively, and the stop member 11 and the light-blocking member 12 stop when the stop member 11 abuts on the stopper 1s. Immediately after that, power to the motors 3 and 4 is disconnected, and the shutter is restored to an initial state of FIG. 6.

According to the second embodiment, as mentioned above, the shutter is constructed so that partial contact between the shutter blade 8 and the stop member 11 is consistently maintained and the area of this contact is continuously changed in any operating condition. Consequently, a plate member (an intermediate plate) for partitioning the blade chamber into two parts, such as that described in the above publication, becomes unnecessary. According to the second embodiment, therefore, the thickness of an area in the proximity of the exposure aperture can be reduced, at least, by a thickness corresponding to the plate member. In addition to the fact that cost advantages are obtained because the plate member is dispensed with, the plane area of the unit can be made smaller than in the case of the first embodiment. Also, although in the second embodiment the aperture 11b of the stop member 11 is not covered with the ND filter, it may be covered as in the first embodiment. The structure of the shutter blades is not limited to that of the second embodiment.

In each of the above embodiments, a state where the stop member 9 or 11 is removed from the exposure aperture is thought of as the initial state, but a state where it is introduced into the exposure aperture may be as the initial state. The shutter blades 7 and 8 may be designed to close the aperture when the camera is not used and to filly open it when the power is turned on. In doing so, deterioration in performance of the image sensor can be prevented. In the use of a film camera, when photographing is not performed, it is only necessary that the shutter blades 7 and 8 are brought into the closed state, irrespective of the on-off operation of the power, and after the light-amount control mechanism is first actuated by the release of the shutter, then the opening and closing operations of the shutter blades 7 and 8 are performed.

In the present invention, mentioned above, when the shutter blades and the light-amount control mechanism which are operated by individual motors are unified, the plate member partitioning the blade chamber into two as in the conventional shutter can be dispensed with, and thus it becomes possible to reduce the thickness of the area immediately the photographic lens and arrange the shutter blades and the light-amount control mechanism so that they are brought close to each other. This is very effective for compactness of the camera. When the light-amount control mechanism is constructed as in the second embodiment, the plane area of the unit can be downsized.

What is claimed is:

1. A lens shutter for cameras, comprising:
   two base plates in which a blade chamber is provided between said two base plates and apertures of said two base plates are superposed to provide a circular exposure aperture;
   a shutter blade located in said blade chamber to perform an opening and closing operation of said exposure aperture;
   a first motor mounted to one of said base plates outside said blade chamber so that an output port extends to said blade chamber to cause said shutter blade to perform said opening and closing operation;

light-amount control device located in said blade chamber constructed and arranged to perform introducing and removing operations with respect to said exposure aperture; and a second motor mounted to one of said base plates outside said blade chamber so that an output port extends to said blade chamber to cause said light-amount control device constructed and arranged to perform said introducing and removing operations, wherein said light-mount control device is located so that a part thereof always overlaps said shutter blade adjacent thereto in any operating condition.

2. A lens shutter for cameras according to claim 1, wherein said light-amount control device has and aperture smaller in diameter than said exposure aperture so that said aperture is introduced into, and removed from, said exposure aperture.

3. A lens shutter for cameras according to claim 2, wherein said aperture of said light-amount control device is covered with a sheet of an ND filter.

4. A lens shutter for cameras according to claim 2, wherein said aperture of said light-amount control device is covered with a sheet of an ND filter, and said ND filter is configured to be operated in a concavity formed on one of said base plates that is adjacent to said light-amount control device.

5. A lens shutter for cameras, comprising:

two base plates in which a blade chamber is provided between said two base plates and apertures of said two base plates are superposed to provide a circular exposure aperture;

a shutter blade located in said blade chamber to perform an opening and closing operation of said exposure aperture;

a first motor mounted to one of said base plates outside said blade chamber so that an output port extends to said blade chamber to cause said shutter blade to perform said opening and closing operation;

light-amount control device located in said blade chamber constructed and arranged to perform introducing and removing operations with respect to said exposure aperture; and a second motor mounted to one of said base plates outside said blade chamber so that an output port extends to said blade chamber to cause said light-amount control device constructed and arranged to perform said introducing and removing operations, wherein said light-mount control device is located so that a part thereof always overlaps said shutter blade adjacent thereto in any operating condition.

wherein said light-amount control device includes a first member having an aperture smaller in diameter than said exposure aperture and a second member having only a function of blocking light, and wherein when said aperture of said first member is introduced into said exposure aperture, a gap is provided between first said member and an edge of said aperture and is covered with said second member.

6. A lens shutter for cameras according to claim 5, wherein said aperture of said light-amount control device is covered with a sheet of an ND filter.

* * * * *